DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 3, 1972

903 O.G. 6

T903,009

PHOSPHORUS-FREE CLEANING FORMULATIONS

Richard D. Katstra, Englewood Cliffs, N.J., assignor to Continental Oil Company, Ponca City, Okla.

Filed Sept. 22, 1971, Ser. No. 182,863

**Int. Cl. C11d *1/12***

U.S. Cl. 252—559

No Drawing. 17 Pages Specification

Phosphorus-free cleaning formulations containing only surface active materials. The surface active materials used include a major proportion of a nonionic surfactant and a lesser amount of an alkyl aryl sulfonate salt.